(12) United States Patent
Kitayama et al.

(10) Patent No.: US 10,302,156 B2
(45) Date of Patent: May 28, 2019

(54) ROTATION TRANSMISSION DEVICE

(71) Applicant: NTN CORPORATION, Osaka (JP)

(72) Inventors: Naotsugu Kitayama, Shizuoka (JP);
Kyohei Sasanuma, Shizuoka (JP);
Marina Fukunari, Shizuoka (JP);
Takahide Saito, Shizuoka (JP); Koji Sato, Shizuoka (JP); Masahiro Kawai, Shizuoka (JP)

(73) Assignee: NTN CORPORATION, Osaka (JP)

( * ) Notice: Subject to any disclaimer, the term of this patent is extended or adjusted under 35 U.S.C. 154(b) by 602 days.

(21) Appl. No.: 14/912,245

(22) PCT Filed: Aug. 8, 2014

(86) PCT No.: PCT/JP2014/071032
§ 371 (c)(1),
(2) Date: Feb. 16, 2016

(87) PCT Pub. No.: WO2015/025739
PCT Pub. Date: Feb. 26, 2015

(65) Prior Publication Data
US 2016/0186820 A1    Jun. 30, 2016

(30) Foreign Application Priority Data

Aug. 19, 2013    (JP) ................................ 2013-169701

(51) Int. Cl.
*F16D 41/08* (2006.01)
*F16D 27/112* (2006.01)
(Continued)

(52) U.S. Cl.
CPC ......... *F16D 41/088* (2013.01); *F16D 27/108* (2013.01); *F16D 27/112* (2013.01); *F16D 2023/123* (2013.01)

(58) Field of Classification Search
CPC .... F16D 41/088; F16D 27/108; F16D 27/112; F16D 2023/123; F16D 51/08; F16D 47/04; F16D 41/08
See application file for complete search history.

(56) References Cited

U.S. PATENT DOCUMENTS

| 5,651,437 A | 7/1997 | Organek et al. |
| 6,082,480 A * | 7/2000 | Itoh ........................ B60K 23/08 180/247 |

(Continued)

FOREIGN PATENT DOCUMENTS

| CN | 1174140 | 2/1998 |
| CN | 1877152 | 12/2006 |

(Continued)

OTHER PUBLICATIONS

International Search Report dated Nov. 18, 2014 in corresponding International Application No. PCT/JP2014/071032 (with English translation).

*Primary Examiner* — Huan Le
(74) *Attorney, Agent, or Firm* — Wenderoth, Lind & Ponack, L.L.P.

(57) ABSTRACT

A rotation transmission device is provided in which leakage of magnetism from an armature to a control retainer is reduced, and of which a two-way clutch can be operated accurately and reliably. This device includes a restricting arrangement for restricting the fitting amount between a coupling tube of the armature and a tubular portion of the control retainer such that a gap is defined between a back surface of the armature, with respect to its surface to be attracted to a rotor, and an end surface of the tubular portion, to prevent leakage of magnetism from the back surface of the armature to the end surface of the tubular portion when an electromagnet is energized and the armature is pulled to the rotor.

17 Claims, 9 Drawing Sheets

(51) Int. Cl.
  *F16D 27/108*   (2006.01)
  *F16D 23/12*    (2006.01)

(56) References Cited

U.S. PATENT DOCUMENTS

| | | | | |
|---|---|---|---|---|
| 6,132,332 | A | * | 10/2000 | Yasui ................ B60K 17/3505 477/36 |
| 2002/0134634 | A1 | * | 9/2002 | Ito .......................... B60K 6/387 192/35 |
| 2006/0278494 | A1 | | 12/2006 | Itomi |
| 2009/0229945 | A1 | * | 9/2009 | Sato ..................... F16D 41/088 192/110 R |
| 2013/0299298 | A1 | | 11/2013 | Akiyoshi et al. |
| 2014/0216882 | A1 | | 8/2014 | Kitayama et al. |
| 2014/0345999 | A1 | | 11/2014 | Kitayama et al. |

FOREIGN PATENT DOCUMENTS

| | | |
|---|---|---|
| DE | 39 10046 | 10/1990 |
| JP | 53-71155 | 6/1978 |
| JP | 59-69678 | 5/1984 |
| JP | 62-202532 | 12/1987 |
| JP | 2007-187283 | 7/2007 |
| JP | 2012-149746 | 8/2012 |
| JP | 2013-83353 | 5/2013 |
| JP | 2013-145045 | 7/2013 |

\* cited by examiner (a) (b)

ROTATION TRANSMISSION DEVICE

TECHNICAL FIELD

This invention relates to a rotation transmission device used to selectively allow and prohibit transmission of torque.

BACKGROUND ART

Known rotation transmission devices for selectively allowing and prohibiting transmission of torque from a driving shaft to a driven shaft include one having a two-way clutch which can be engaged and disengaged by an electromagnetic clutch.

The below-identified Patent document 1 discloses a rotation transmission device including a two-way clutch which is selectively engaged and disengaged by an electromagnetic clutch. This two-way clutch includes a control retainer and a rotary retainer both having bars disposed between an outer ring and an inner ring provided inside of the outer ring, and arranged such that the bars of one of the retainers circumferentially alternate with the bars of the other retainer, thereby defining pockets between adjacent bars. A pair of rollers are mounted in each pocket, and biased away from each other by an elastic member mounted therebetween to a stand-by position where the rollers engage a cylindrical surface formed on the inner periphery of the outer ring, and cam surfaces formed on the outer periphery of the inner ring, whereby when the inner ring is rotated in one direction, one of each pair of rollers become wedged between the cylindrical surface and the corresponding cam surface, so that the rotation of the inner ring is transmitted to the outer ring.

The electromagnetic clutch for controlling the two-way clutch includes an electromagnet configured, when energized, to move the control retainer in an axial direction. When the control retainer is moved in the axial direction, the control retainer and the rotary retainer are rotated relative to each other in the direction in which the circumferential widths of the pockets decrease, by the action of a torque cam, as a motion converting mechanism, provided between the opposed surfaces of a flange of the control retainer and a flange of the rotary retainer. As a result, the pairs of rollers are moved to the disengaged positions by the bars of the respective retainers, thus prohibiting transmission of rotation from the inner ring to the outer ring.

In this rotation transmission device, when the electromagnet of the electromagnetic clutch is de-energized, the control retainer and the rotary retainer are rotated relative to each other in the direction in which the circumferential widths of the pockets increase, so that the opposed pairs of rollers instantly engage the cylindrical surface and the cam surfaces. That is, since there exists very little looseness in the rotational direction, responsiveness of the two-way clutch is excellent.

PRIOR ART DOCUMENT(S)

Patent Document(s)

Patent document 1: Japanese Patent Publication No. 2012-149746A

In the rotation transmission device disclosed in Patent document 1, the electromagnetic clutch includes an armature coupled to the control retainer, a rotor axially opposed to and spaced from the armature, and an electromagnet supported by a stationary member and axially opposed to the rotor, and configured, when the electromagnet is energized, to apply a magnetic attracting force to the armature, thereby attracting the armature to the rotor, and moving the control retainer in the axial direction together with the armature.

In this rotation transmission device, the armature and the control retainer are coupled together by press-fitting a tubular portion provided at the outer periphery of the control retainer into a coupling tube provided at the outer periphery of the armature until the end surface of the tubular portion is brought into abutment with the back surface of the armature, with respect to the surface of the armature to be attracted to the rotor, to restrict the depth by which the tubular portion is press-fitted in to the coupling tube. Thus, while the armature is attracted to the rotor, magnetism tends to leak significantly from the back surface of the armature to the end surface of the tubular portion. Since such leakage of magnetism could cause the armature to fail to be attracted to the rotor, it is necessary to provide an electromagnet which is large in size and thus in capacity, and/or to increase the voltage applied. This restricts the freedom of the design of these portions. It is therefore desired to improve the freedom of design of these portions.

In this rotation transmission device, a bearing is kept in abutment with an axial end surface of a rotor fitting shaft portion formed on the input shaft to rotatably support the input shaft relative to the electromagnet, and to restrict the axial position of the electromagnet. On the other hand, the rotor is kept in abutment with a flange provided on the input shaft to restrict the axial position of the rotor, thereby adjusting the axial gap defined between the opposed portions of the rotor and the electromagnet. Thus, since the axial gap is adjusted indirectly through the input shaft, the axial gap tends to vary in size, which in turn tends to destabilize the magnetic attracting force applied to the armature. This in turn makes it necessary to use an electromagnet which is large in size and thus in capacity, and/or increase the input voltage, in order to stabilize the magnetic attracting force. It is therefore desired to stabilize the magnetic attracting force.

An object of the present invention is to provide a rotation transmission device in which leakage of magnetism from the armature to the control retainer is reduced, and of which the two-way clutch can be operated accurately and reliably.

Means for Achieving the Object

In order to achieve this object, the present invention provides a rotation transmission device comprising an input shaft, an output shaft arranged coaxial with the input shaft, a two-way clutch configured to selectively allow and prohibit transmission of rotation between the input shaft and the output shaft, and an electromagnetic clutch configured to selectively engage and disengage the two-way clutch, wherein the two-way clutch comprises an outer ring provided at an end of the output shaft and having an inner periphery, an inner ring provided at an end of the input shaft and having an outer periphery, a control retainer and a rotary retainer including, respectively, first bars and second bars which are disposed between the inner periphery of the outer ring and the outer periphery of the inner ring, and arranged such that the first bars are arranged circumferentially alternately with the second bars to define pockets between adjacent pairs of the first and second bars, wherein the control retainer further comprises a tubular portion formed at an outer peripheral portion of the control retainer, pairs of engaging elements, each pair being received in one of the pockets so as to be engageable with the inner periphery of the outer ring and the outer periphery of the inner ring; and elastic members each received in one of the pockets and biasing the pair of engaging elements received in the one of the pockets away from each other, wherein the electromagnetic clutch comprises an armature having at an outer peripheral portion thereof a coupling tube press-fitted to the tubular portion of the control retainer such that the armature is coupled to the control retainer due to the press-fitting, a rotor axially opposed to and spaced apart from the armature, and an electromagnet supported by a stationary member so as to be axially opposed to the rotor and configured to apply a magnetic attraction force to the armature when energized, thereby attracting the armature to the rotor, whereby when the electromagnet is energized, the control retainer is moved, together with the armature, in one axial direction toward the rotor, the rotation transmission device further comprising a motion converting mechanism configured to convert a movement of the control retainer in the one axial direction to relative rotation between the control retainer and the rotary retainer in a direction in which circumferential widths of the pockets decrease, thereby disengaging the pairs of engaging elements from the inner periphery of the outer ring and the outer periphery of the inner ring, wherein the rotation transmission device further comprises a restricting means for restricting the fitting amount between the coupling tube of the armature and the tubular portion of the control retainer such that a gap is defined between the back surface of the armature, with respect to the surface of the armature which can be attracted to the rotor, and the end surface of the tubular portion.

The restricting means may comprise a large-diameter formed on the radially outer surface of the tubular portion of the control retainer and having an axial end surface which is in abutment with an end surface of the coupling tube at an open end of the coupling tube.

By providing the restricting means for restricting the fitting amount between the coupling tube of the armature and the tubular portion of the control retainer such that a gap is defined between the back surface of the armature, with respect to the surface of the armature which can be attracted to the rotor, and the end surface of the tubular portion, it is possible to significantly reduce leakage of magnetism from the back surface of the armature to the end surface of the tubular portion of the control retainer, thereby making it possible to operate the two-way clutch accurately and reliably, and also to use a small-capacity electromagnet. This increases the freedom of design.

The rotation transmission device according to the present invention may further comprise a bearing supporting the electromagnet and the input shaft so as to be rotatable relative to each other, wherein the rotor includes an inner tubular portion formed at an inner peripheral portion thereof and having an end surface in abutment with the bearing to restrict the relative axial position between the electromagnet and the rotor. With this arrangement, an axial gap defined between the opposed portions of the rotor and the electromagnet can be always maintained to a constant size. As a result, it is possible to stabilize the magnetic attraction force applied to the armature, and thus stably operate the two-way clutch.

While the electromagnet is not energized, the control retainer is in contact with the end surface of the outer ring. When electric current is applied to the electromagnet in this state, magnetism leaks from the electromagnet to the input shaft and the outer ring, thus generating a magnetic force that tends to pull the armature to the outer ring through the control retainer. This could make it difficult to stably attract the armature to the rotor.

To avoid this problem, a magnetism shield ring made of a non-magnetic material may be provided on at least one of the axially opposed surfaces of the outer ring and the control retainer, or the control retainer may be made of a non-magnetic, sintered material. With this arrangement, leakage of magnetism from the outer ring to the armature is prevented when electric current is applied to the electromagnet, and as a result, the armature begins to be pulled toward the rotor. This makes it possible to stably attract the armature to the rotor, and to use a small-capacity electromagnet, thus increasing the freedom of design.

Advantages of the Invention

According to the present invention, by the provision of a restricting means for restricting the amount of fitting between the armature and the tubular portion such that a gap is defined between the back surface of the armature, with respect to its surface to be attracted to the rotor, and the end surface of the tubular portion of the control retainer, it is possible to reduce leakage of magnetism from the armature to the control retainer, thereby making it possible to operate the two-way clutch accurately and reliably.

BRIEF DESCRIPTION OF THE DRAWINGS

FIG. 7(*b*) shows an operational state.
FIG. 12(*b*) is an enlarged view of a portion of FIG. 12(*a*).

BEST MODE FOR EMBODYING THE INVENTION

Figure 1:
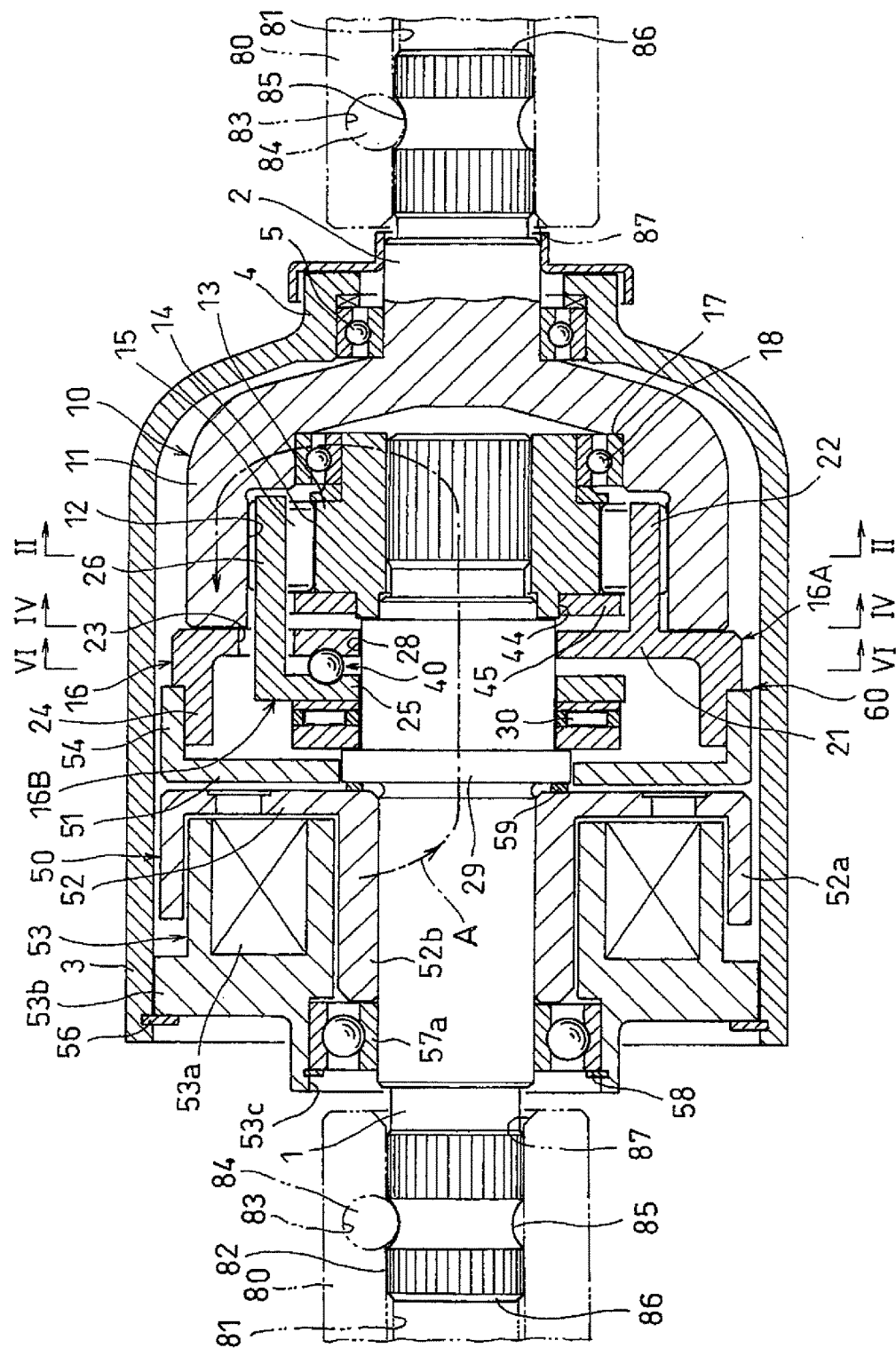
FIG. 1 is a vertical sectional view of a rotation transmission device embodying the present invention.

Now referring to the drawings, embodiments of the present invention will be described. FIG. 1 shows a rotation transmission device according to one embodiment of the present invention. As shown, this rotation transmission device comprises an input shaft 1, an output shaft 2 arranged coaxially with the input shaft 1, a housing 3 as a stationary member covering the end portions of the input shaft 1 and the output shaft 2, a two-way clutch 10 mounted in the housing 3 and configured to selectively allow and prohibit transmission of rotation from the input shaft 1 to the output shaft 2, and an electromagnetic clutch 50 for selectively engaging and disengaging the two-way clutch 10.

The housing 3 is a cylindrical member having a small-diameter bearing tube 4 at one end thereof. A bearing 5 is mounted in the bearing tube 4 to rotatably support the output shaft 2.

Figure 2:
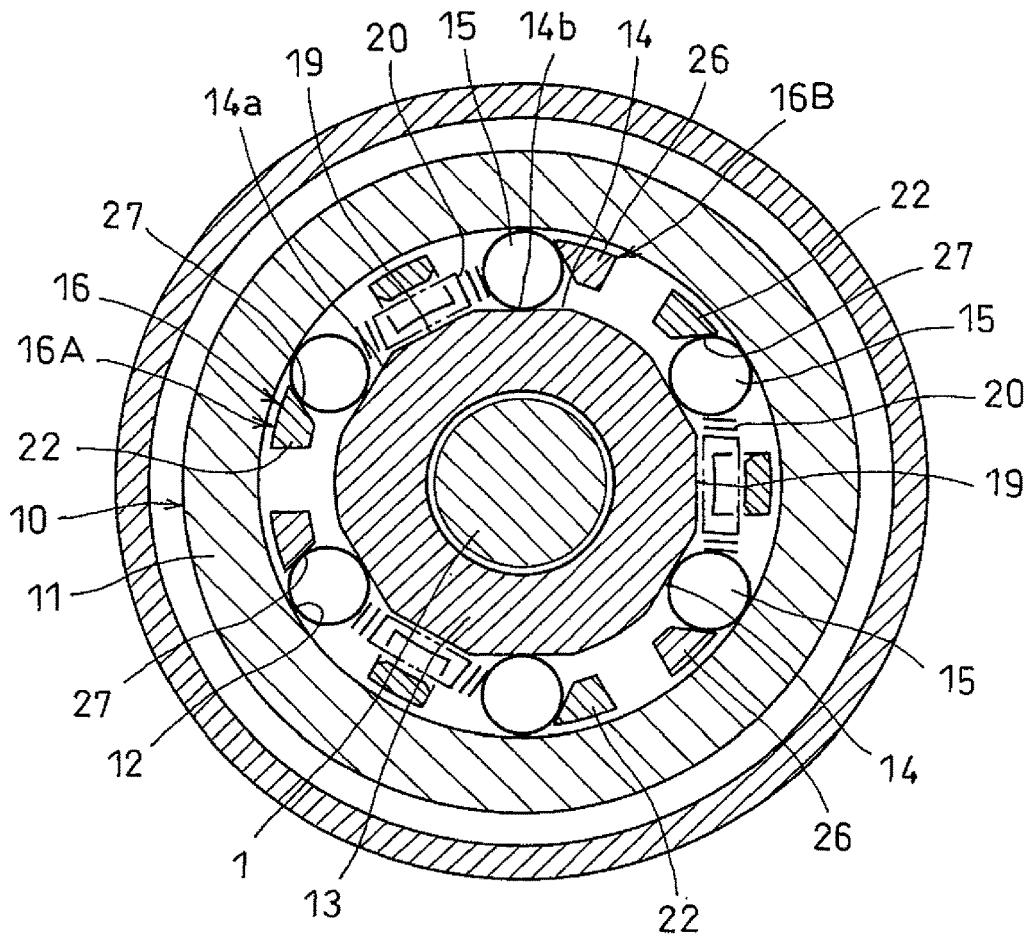
FIG. 2 is a sectional view taken along line II-II of FIG. 1.

As shown in FIGS. 1 and 2, the two-way clutch 10 includes an outer ring 11 provided at the end of the output shaft 2 and having a cylindrical surface 12 on the outer periphery thereof, an inner ring 13 provided at the end of the input shaft 1 and having, on the outer periphery thereof, a plurality of circumferentially equidistantly spaced apart cam surfaces 14. A pair of rollers 15 as engaging elements and an elastic member 20 are disposed between each cam surface 14 and the cylindrical surface 12, with the rollers 15 retained by a retainer 16, whereby when the inner ring 13 is rotated in one direction, one of each pair of the rollers 15 is engaged between the cylindrical surface 12 and the cam surface 14, thereby transmitting the rotation of the inner ring 13 to the outer ring 11, and when the inner ring 13 is rotated in the other direction, the other of each pair of the rollers 15 is engaged between the cylindrical surface 12 and the cam surface 14, thereby transmitting the rotation of the inner ring 13 to the outer ring 11.

The outer ring 11 includes a closed end having an inner surface formed with a small-diameter recess 17 in which is mounted a bearing 18 rotatably supporting the end of the inner ring 13.

While in the embodiment, the inner ring 13 is fitted to the end of the input shaft 1 through serrations so as to be rotationally fixed to the input shaft 1, the inner ring 13 may be instead formed integral with the input shaft 1. Each of the cam surfaces 14 formed on the outer periphery of the inner ring 13 comprises a pair of inclined surface portions 14a and 14b inclined in opposite directions to each other to define a wedge-shaped space narrowing toward its respective circumferential ends, between each inclined surface portion 14a, 14b and the cylindrical surface 12 of the outer ring 11. Between the pair of inclined surface portions 14a and 14b, a flat spring support surface 19 is formed to extend in the tangential direction of the inner ring 13, and supports the elastic member 20.

The elastic members 20 comprise coil springs each disposed between each pair of the rollers 15 to bias the pair of rollers 15 away from each other, thereby keeping the pair of rollers 15 in stand-by positions where the rollers engage the cylindrical surface 12 and the cam surface 14.

Figure 6:
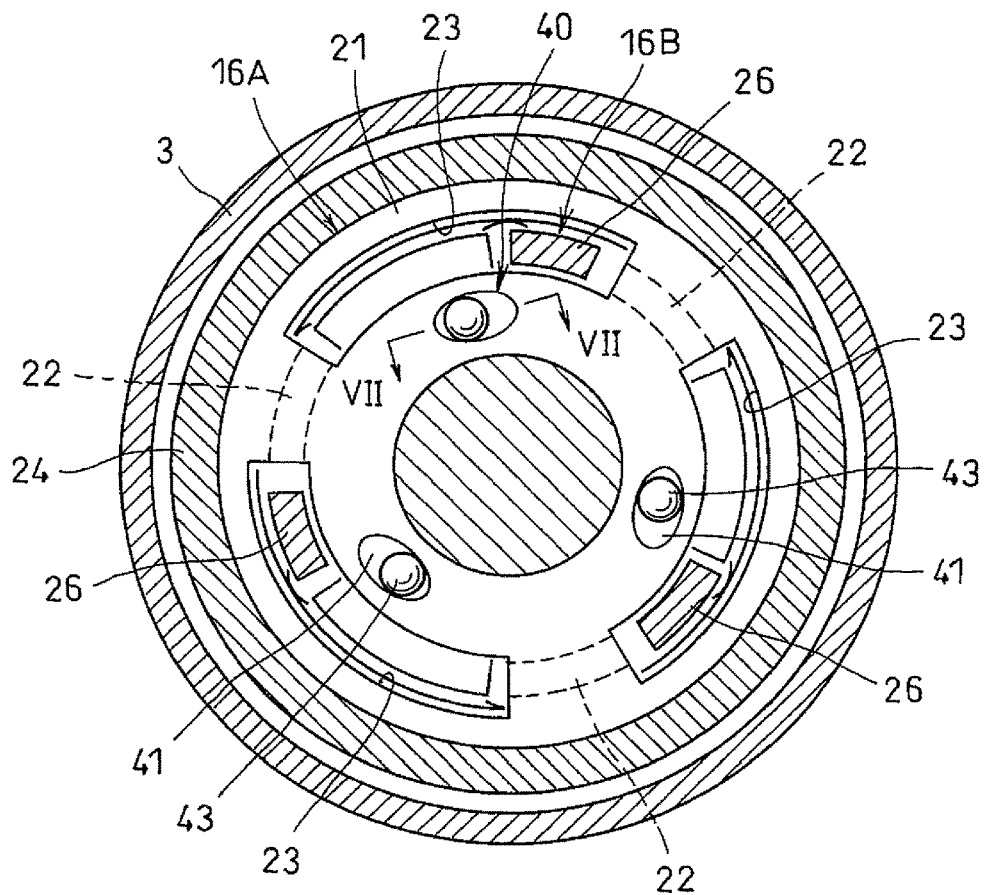
FIG. 6 is a sectional view taken along line VI-VI of FIG. 1.

The retainer 16 comprises a control retainer 16A and a rotary retainer 16B. As shown in FIGS. 1 and 6, the control retainer 16A includes an annular flange 21, and first bars 22 equal in number to the cam surfaces 14 and extending from the outer peripheral portion of one side surface of the annular flange 21 while being circumferentially equidistantly spaced apart from each other. The annular flange 21 is formed with circular arc-shaped elongated holes 23 between the respective adjacent pairs of bars 22. The control retainer 16A further includes a tubular portion 24 extending in the opposite direction to the bars 22 from the outer periphery of the annular flange 21.

The rotary retainer 16B includes an annular flange 25, and second bars 26 equal in number to the cam surfaces 14 and extending from the outer periphery of the annular flange 25 while being circumferentially equidistantly spaced apart from each other.

The control retainer 16A and the rotary retainer 16B are arranged such that the bars 26 of the rotary retainer 16B are inserted through the elongated holes 23 of the control retainer 16A and arranged circumferentially alternately with the bars 22 of the control retainer 16A, with the distal ends of the bars 22 and 26 disposed between the outer ring 11 and the inner ring 13, and the flange 21 of the control retainer 16A and the flange 25 of the rotary retainer 16B located outside the outer ring 11.

With the retainers 16A and 16B mounted in position in this manner, pockets 27 are defined, as shown in FIG. 2, between the bars 22 of the control retainer 16A and the corresponding bars 26 of the rotary retainer 16B. The pockets 27 are radially opposed to the respective cam surfaces 14 of the inner ring 13, and an opposed pair of the rollers 15 as engaging elements and one of the elastic members 20 are mounted in each pocket 27.

As shown in FIG. 1, the flange 21 of the control retainer 16A and the flange 25 of the rotary retainer 16B are slidably supported by a cylindrical slide guide surface 28 formed on the outer periphery of the input shaft 1.

A flange 29 is provided at the end of the slide guide surface 28 on the side of the electromagnetic clutch 50. The rotary retainer 16B is rotatably supported by a thrust bearing 30 mounted between the flange 29 and the flange 25 of the rotary retainer 16B such that the rotary retainer 16B is not movable toward the electromagnetic clutch 50.

As shown in FIG. 1, between the flange 21 of the control retainer 16A and the flange 25 of the rotary retainer 16B, a torque cam 40 as a motion converting mechanism is provided which is configured to convert the axial movement of the control retainer 16A to the relative rotary motion between the control retainer 16A and the rotary retainer 16B.

Figure 7:
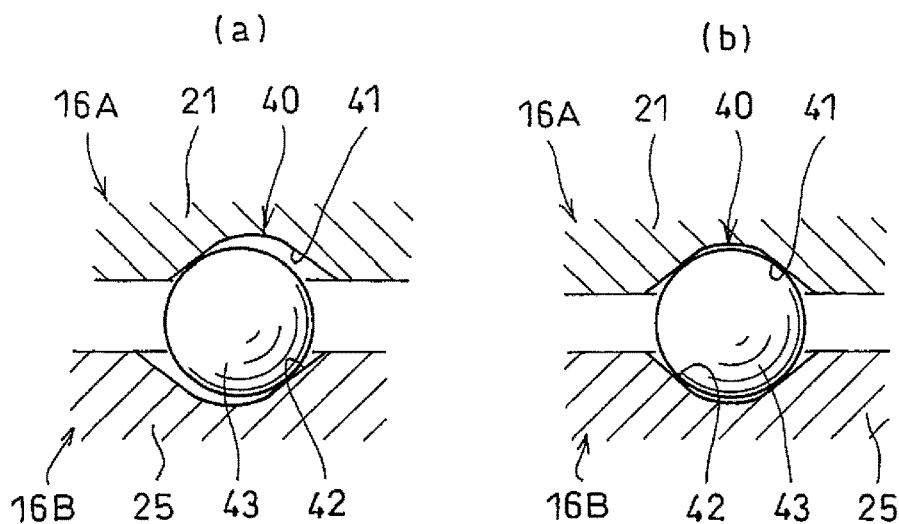
FIG. 7(*a*) is a sectional view taken along line VII-VII of FIG. 6.

As shown in FIGS. 7(a) and 7(b), the torque cam 40 includes cam grooves 41 and 42 formed, respectively, in the opposed surfaces of the flange 21 of the control retainer 16A and the flange 25 of the rotary retainer 16B so that each cam groove 41 is opposed to the corresponding cam groove 42. Each cam groove 41, 42 is deepest at their circumferential center and shallows toward its respective circumferential ends. The torque cam 40 further includes balls 43 each received between one and the other circumferential ends of each opposed pair of the cam grooves 41 and 42.

The cam grooves 41 and 42 shown have a circular arc-shaped section. But grooves having a V-shaped section may be used instead.

The torque cam 40 is configured such that when the control retainer 16A is moved in one axial direction in which the flange 21 of the control retainer 16A moves toward the flange 25 of the rotary retainer 16B, each ball 43 moves while rolling toward the deepest portions of the respective cam grooves 41 and 42 as shown in FIG. 7(b), allowing the control retainer 16A and the rotary retainer 16B to rotate relative to each other in the direction in which the circumferential widths of the pockets 27 decrease.

As shown in FIG. 1, the inner ring 13 has a holder fitting surface 44 formed at its end portion on the side of the slide guide surface 28 formed on the input shaft 1, and having substantially the same diameter as the slide guide surface 28. An annular spring holder 45 is fitted on the holder fitting surface 44, preventing separation of the rollers 15 and the elastic members 20 in the axial direction.

Figure 4:
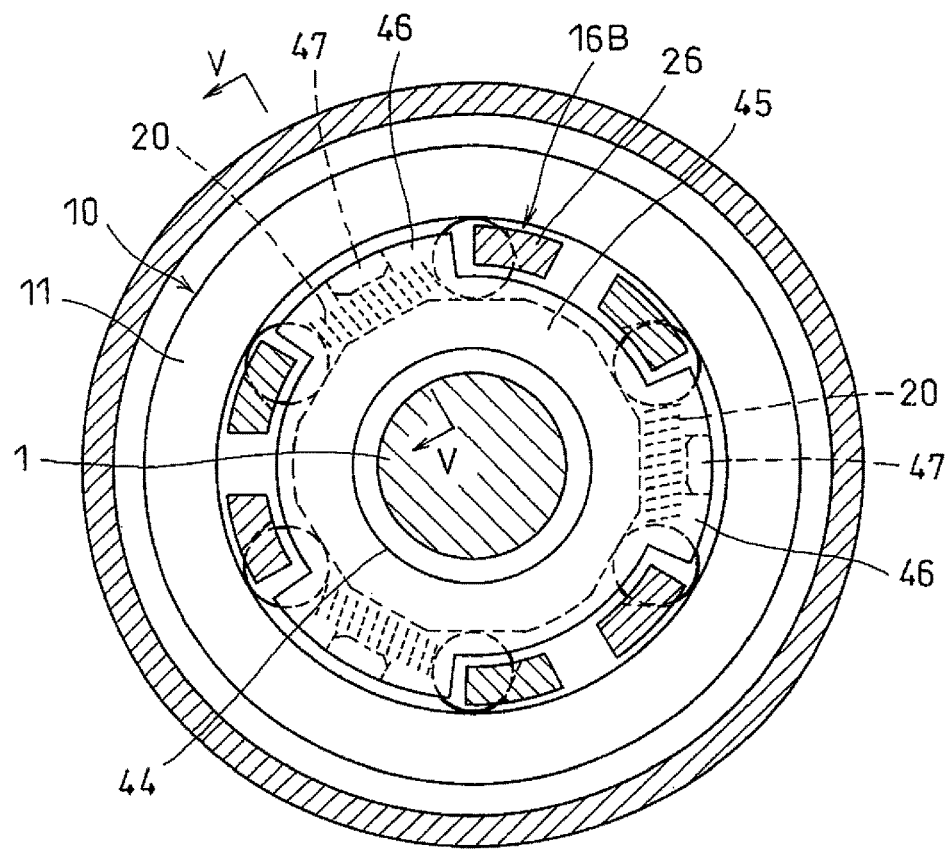
FIG. 4 is a sectional view taken along line IV-IV of FIG. 1.
Figure 5:
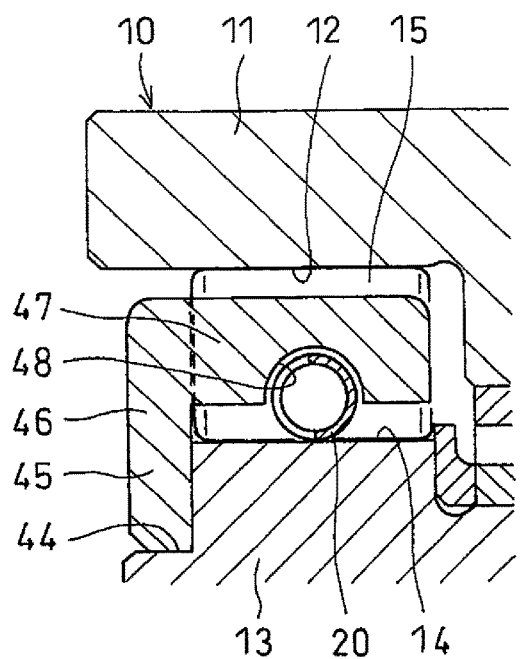
FIG. 5 is a sectional view taken along line V-V of FIG. 4.

The spring holder 45 is held axially in position by being in abutment with an axial end surface of the inner ring 13. As shown in FIGS. 4 and 5, the spring holder 45 includes a plurality of braking pieces 46 formed on the outer periphery thereof so as to be disposed between the bars 22 of the control retainer 16A and the corresponding bars 26 of the rotary retainer 16B.

The braking pieces 46 are arranged such that when the control retainer 16A and the rotary retainer 16B rotate relative to each other in the direction in which the circumferential widths of the pockets 27 decrease, the braking pieces 46 receive the bars 22 of the control retainer 16A and the bars 26 of the rotary retainer 16B at the respective side edges thereof, thereby keeping the respective opposed pairs of rollers 15 in the neutral, disengaged positions.

A spring retaining piece 47 is provided on the outer peripheral portion of each braking piece 46 to extend radially outside of the corresponding elastic member 20. The spring retaining piece 47 has, in the radially inner portion thereof, a cutout 48 in which the outer peripheral portion of the elastic member 20 is fitted such that the elastic member 20 is prevented from moving in the axial direction of the rollers 15 and thus from coming out from between the opposed pair of rollers 15.

As shown in FIG. 1, the electromagnetic clutch 50 includes an armature 51 axially opposed to the end surface of the tubular portion 24 of the control retainer 16A, a rotor 52 axially opposed to the armature 51, and an electromagnet 53 axially opposed to the rotor 52.

The armature 51 is rotatably and slidably supported by the flange 29 of the input shaft 1. The armature 51 includes a coupling tube 54 provided at the outer peripheral portion thereof. The tubular portion 24 of the control retainer 16A is press-fitted in the radially inner surface of the coupling tube 54, whereby the armature 51 is fixedly coupled to the control retainer 16A.

Between the tubular portion 24 and the coupling tube 54, a restricting means 60 is provided to restrict the depth by which the tubular portion 24 is press-fitted into the coupling tube 54, thereby defining a gap 55 between the back surface of the armature 51, with respect to its surface attracted to the rotor 52, and the end surface of the tubular portion 24.

Figure 8:
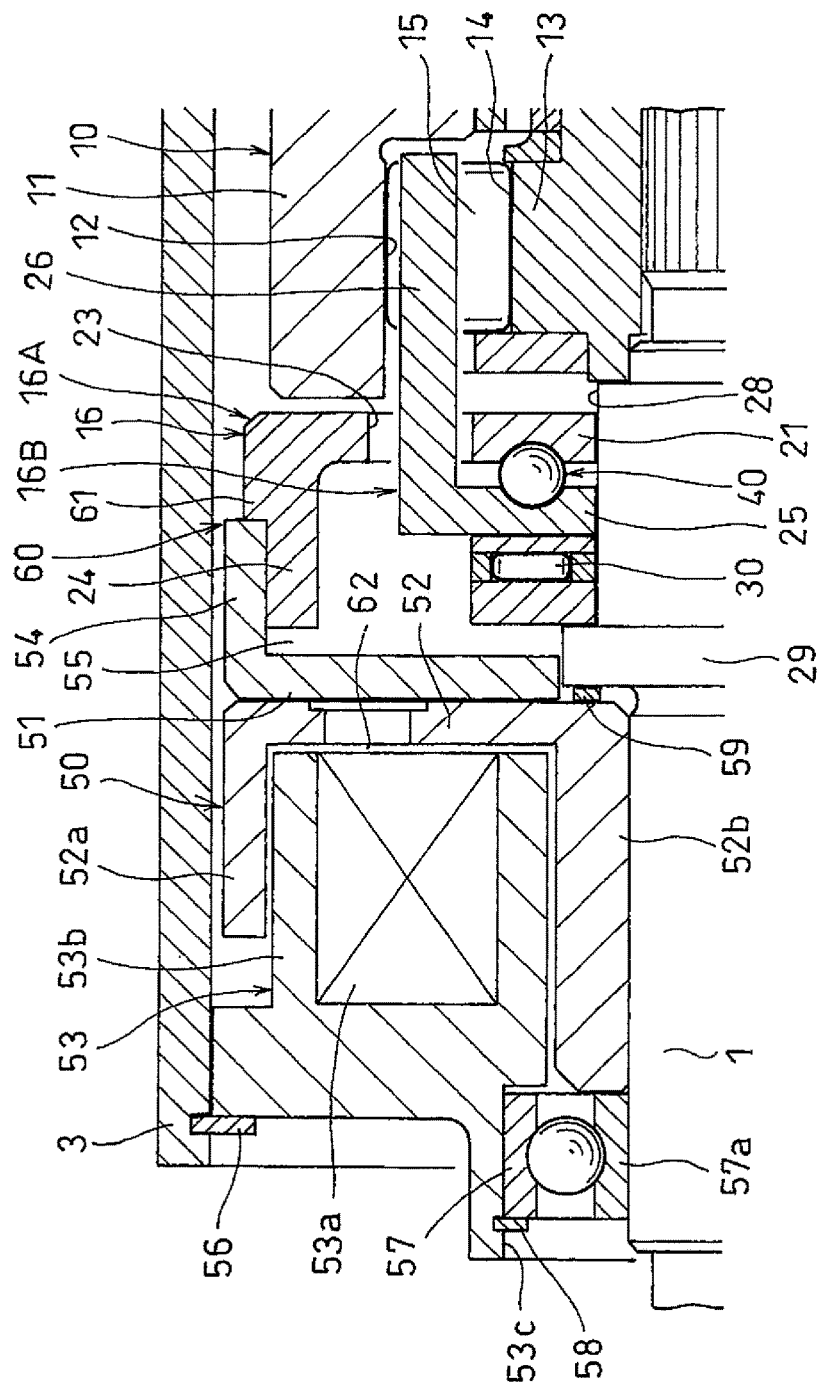
FIG. 8 is a sectional view showing an operational state of an electromagnetic clutch of FIG. 1.

As shown in FIG. 8, the restricting means 60 is constituted by a large-diameter portion 61 of the radially outer surface of the tubular portion 24 of the control retainer 16A. The large-diameter portion 61 has an axial end surface with which the open end surface of the coupling tube 54 is in abutment.

Since the armature 51 is coupled to the tubular portion 24 of the control retainer 16A, the armature 51 is supported at two axially separate portions, namely, by the outer periphery of the flange 29 and the slide guide surface 28 on the outer periphery of the input shaft 1.

The rotor 52 includes an outer tubular portion 52a and an inner tubular portion 52b which is fitted on the input shaft 1 so as to be rotationally fixed to the input shaft 1, and is held in position in the axial direction by the flange 29 of the input shaft 1.

The electromagnet 53 comprises an electromagnetic coil 53a, and a core 53b supporting the electromagnetic coil 53a. The core 53b is fitted in the opening of the housing 3, which is a stationary member, at the other end thereof, and is prevented from getting out of the opening by a snap ring 56 mounted to the other end of the housing 3. The input shaft 1 is supported by the core 53b through a bearing 57 fitted on the input shaft 1 so as to be rotatable relative to the core 53b.

The bearing 57 is fitted in a large-diameter hole 53c formed in the end of the core 53b, and is kept from coming out of the hole 53c by a snap ring 58 mounted to the open end of the large-diameter hole 53c.

A shim 59 mounted between the rotor 52 and the flange 29 keeps the end surface of the inner tubular portion 52b of the rotor 52 in abutment with the inner ring 57a of the bearing 57, thereby restricting the axial relative position between the electromagnet 53 and the rotor, and also pressing the electromagnet 53 against the snap ring 56 and preventing separation of the electromagnet 53.

Figure 3:
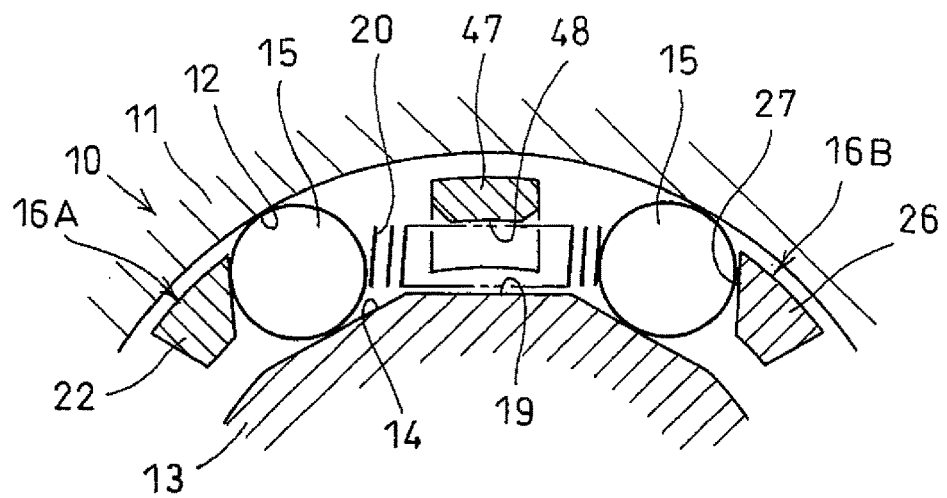
FIG. 3 is an enlarged sectional view of a portion of FIG. 2.

FIG. 1 shows this rotation transmission device when the electromagnetic coil 53a of the electromagnet 53 is not energized. In this state, the armature 51 is separate from the rotor 52, and as shown in FIG. 3, the respective opposed pairs of rollers 15 of the two-way clutch 10 are in the stand-by position where they engage the cylindrical surface 12 of the outer ring 11 and the cam surfaces 14 of the inner ring 13.

With the two-way clutch 10 in the stand-by position, when the electromagnetic coil 53a is energized, a magnetic attraction force acts on the armature 51, which causes the armature 51 to be moved in the axial direction until, as shown in FIG. 8, the armature 51 is pressed against the rotor 52.

Since the coupling tube 54 of the armature 51 is pressed on the tubular portion 24 of the control retainer 16A such that the armature 51 is fixedly coupled to the control retainer 16A, when the armature 51 is moved in the axial direction, the control retainer 16A is moved in the direction in which the flange 21 of the control retainer 16A moves toward the flange 25 of the rotary retainer 16B.

At this time, the balls 43 move, while rolling, from the position shown in FIG. 7(a) to the position shown in FIG. 7(b), where the balls 43 are at the deepest portions of the respective cam grooves 41 and 42. This causes the control retainer 16A and the rotary retainer 16B to be rotated relative to each other in the direction in which the circumferential widths of the pockets 27 decrease. As a result, each opposed pair of rollers 15 are pushed by the bar 22 of the control retainer 16A and the bar 26 of the rotary retainer 16B, respectively, and moved toward each other to the neutral positions where the rollers 15 are disengaged from the cylindrical surface 12 and the cam surfaces 14. The two-way clutch 10 thus disengages.

With the two-way clutch 10 disengaged, when torque is applied to the input shaft 1, thereby rotating the inner ring 13 in one direction, the braking pieces 46 formed on the spring holder 45 presses either the bars 22 of the control retainer 16A or the bars 26 of the rotary retainer 16B, thereby rotating the control retainer 16A and the rotary retainer 16B together with the inner ring 13. Thus, since the opposed pairs of rollers 15 are in their neutral, disengaged position, the rotation of the inner ring 13 is not transmitted to the outer ring 11, so that the inner ring 13 rotates independently of the outer ring 11.

When the control retainer 16A and the rotary retainer 16B rotate relative to each other in the direction in which the circumferential widths of the pockets 27 decrease, the bars 22 of the control retainer 16A and the bars 26 of the rotary retainer 16B abut the respective side edges of the braking pieces 46 of the spring holder 45, thereby restricting the amount of relative rotation between the control retainer 16A and the rotary retainer 16B.

This prevents the elastic members 20 from being unnecessarily and unduly compressed, so that even after repeated compression and expansion, the elastic members 20 will never be broken due to fatigue.

With the inner ring 13 rotating independently of the outer ring 11, when the electromagnetic coil 53a is de-energized, the magnetic attraction force applied to the armature 51 disappears, so that, under the biasing force of the elastic members 20, the control retainer 16A and the rotary retainer 16B are rotated relative to each other in the direction in which the circumferential widths of the pockets 27 increase. This causes, as shown in FIG. 3, the opposed pairs of rollers 15 to be moved to the stand-by position where they engage the cylindrical surface 12 and the cam surfaces 14, allowing torque to be transmitted between the inner ring 13 and the outer ring 11 through one of each opposed pair of the rollers 15.

When, in this state, the input shaft 1 is stopped and then rotated in the opposite direction, the rotation of the inner ring 13 is transmitted to the outer ring 11 through the other of each opposed pair of the rollers 15.

As described above, since when the electromagnetic coil 53a is de-energized, the control retainer 16A and the rotary retainer 16B are rotated relative to each other in the direction in which the circumferential widths of the pockets 27 increase, thereby moving the opposed pairs of rollers 15 to the stand-by position where they can instantly become wedged between the cylindrical surface 12 and the cam surfaces 14, there exists little looseness in the rotational direction. Due to this fact and the fact that the inner ring 13 is integral with the input shaft 1, the rotation of the input shaft 1 can be transmitted instantly from the inner ring 13 to the outer ring 11.

Since torque is transmitted from the inner ring 13 to the outer ring 11 through as many rollers 15 as the cam surfaces 14, it is possible to transmit large torque from the inner ring 13 to the outer ring 11.

When the control retainer 16A and the rotary retainer 16B rotate relative to each other in the direction in which the circumferential widths of the pockets 27 increase, the balls 43 are moved to the position shown in FIG. 7(a) where they are at the shallow portions of the respective cam grooves 41 and 42.

As mentioned above, and as shown in FIG. 8, when the electromagnetic coil 53a is energized and thus the armature 51 is pressed against the rotor 52, the gap 55 is defined between the back surface of the armature 51, with respect to its surface attracted to the rotor 52, and the end surface of the tubular portion 24 of the control retainer 16A. The gap 55 prevents leakage of magnetism from the back surface of the armature 51 to the end surface of the tubular portion 24 of the control retainer 16A. This ensures stable operation of the two-way clutch 10 when the electromagnetic coil 53a is energized.

Since, as shown in FIG. 8, the end surface of the inner tubular portion 52b provided at the inner peripheral portion of the rotor 52 is kept in abutment with the bearing 57 relatively rotatably supporting the input shaft 1 and the electromagnet 53, thereby restricting the relative axial position between the electromagnet 53 and the rotor 52, a gap 62 defined between the axially opposed portions of the rotor 52 and the electromagnet 53 can be always maintained to a constant size. As a result, it is possible to stabilize the magnetic attraction force applied to the armature 51, and thus stably operate the two-way clutch 10.

While the electromagnetic coil 53a of the electromagnet 53 is not energized, the control retainer 16A is in contact with the end surface of the outer ring 11. When, in this state, an electric current is applied to the electromagnetic coil 53a, magnetism leaks from the electromagnet 53 to the input shaft 1 and the outer ring 11 as shown by the arrow A in FIG. 1, thus generating a magnetic force that tends to attract the armature 51 to the outer ring 11 through the control retainer 16A. This magnetic force could lower the magnetic attraction force with which the armature 51 is attracted to the rotor 52.

Figure 9:
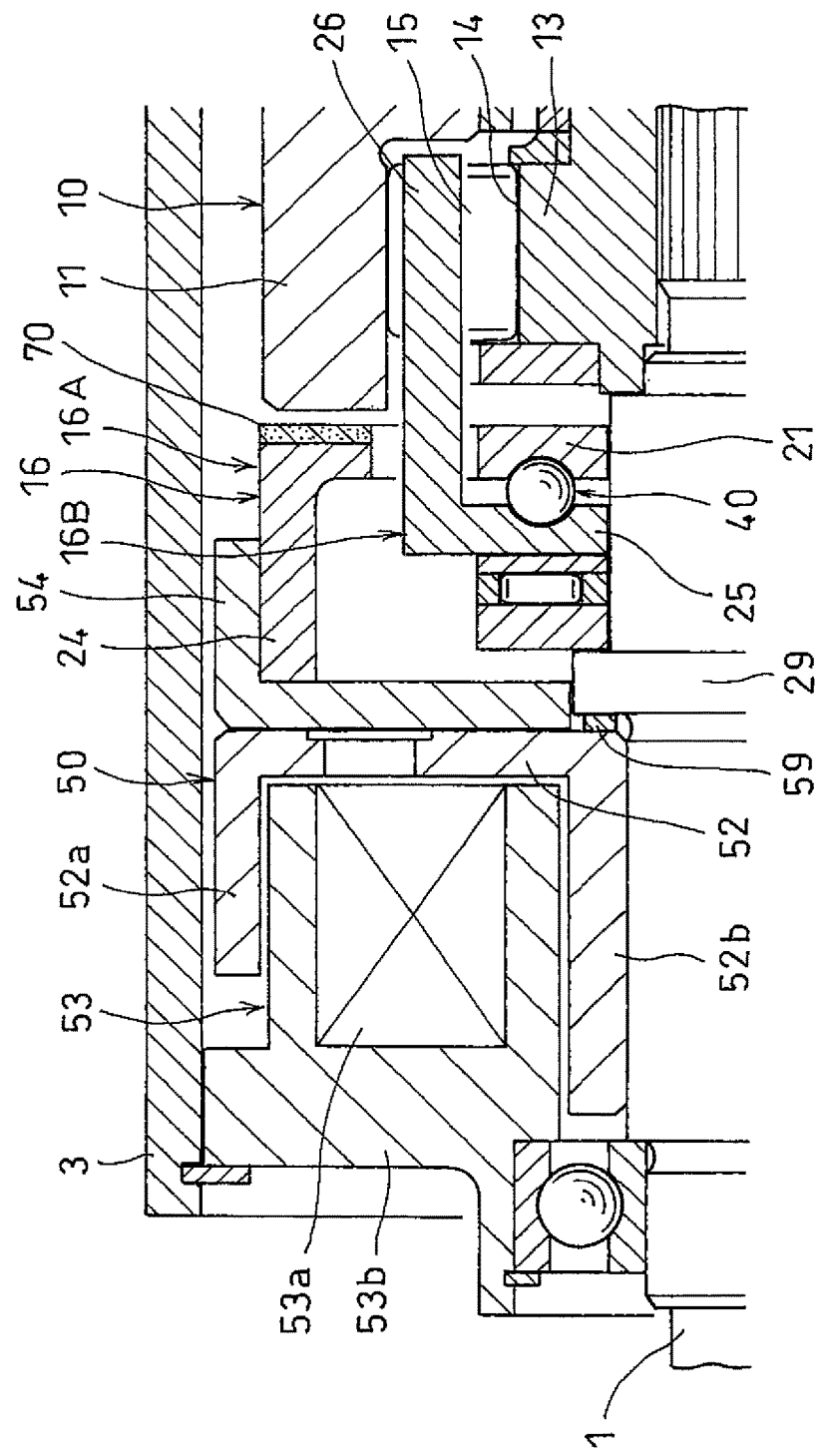
FIG. 9 is a sectional view of a rotation transmission device according to another embodiment of the present invention.

In order to prevent such leakage of magnetism, which occurs immediately after an electric current is applied to the electromagnetic coil 53a, in FIG. 9, a magnetism shield ring 70 is mounted to the surface of the flange 21 of the control retainer 16A that is opposed to the end surface of the outer ring 11, thereby preventing leakage of magnetism from the outer ring 11 to the flange 21 of the control retainer 16A.

Figure 10:
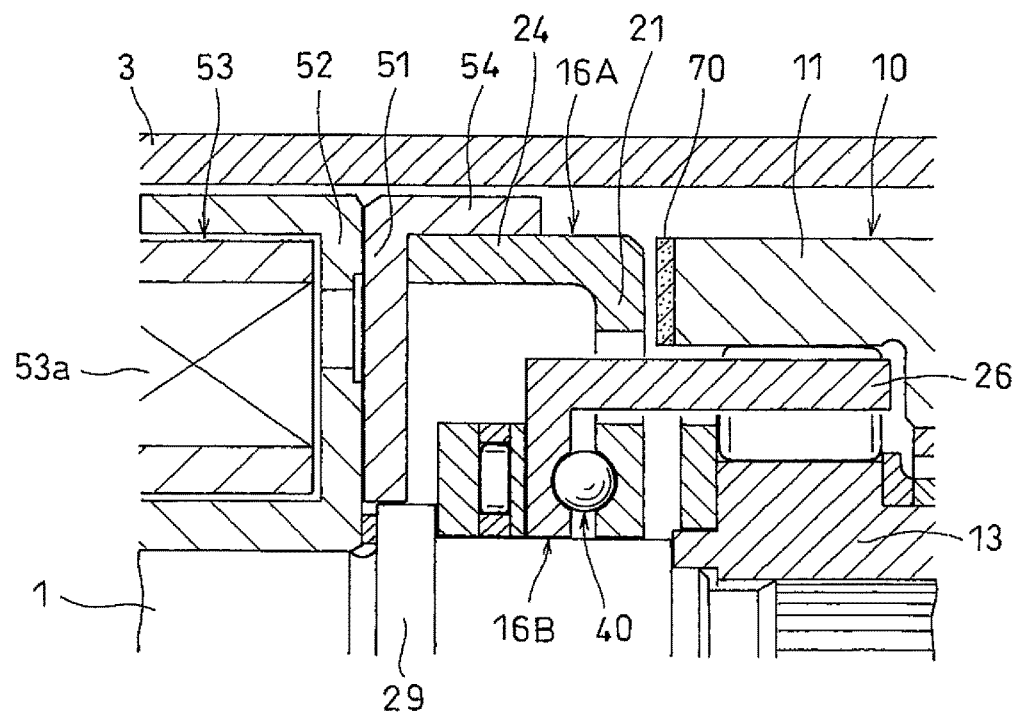
FIG. 10 is a sectional view of a rotation transmission device according to still another embodiment of the present invention.
Figure 11:
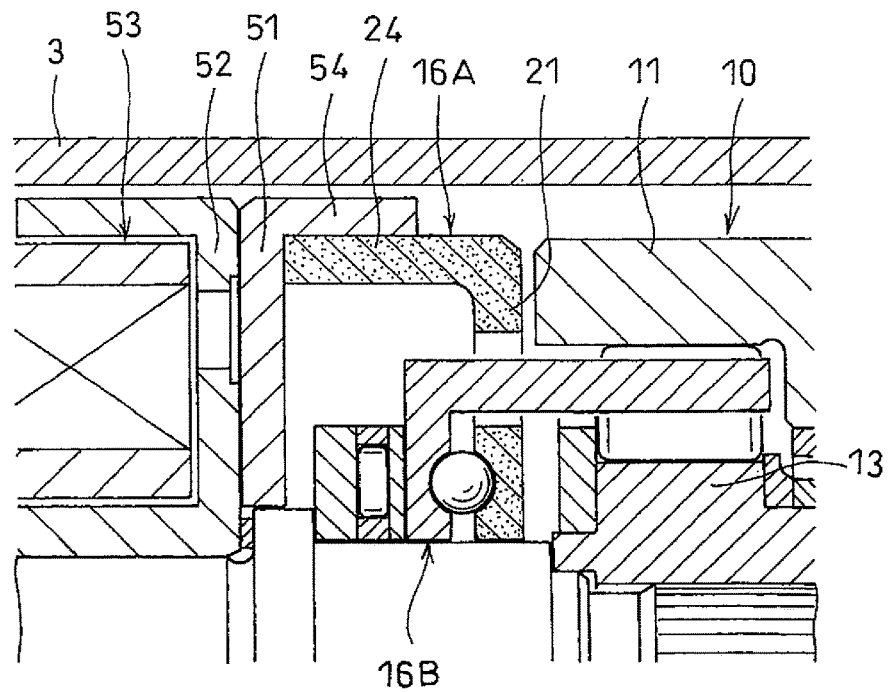
FIG. 11 is a sectional view of a rotation transmission device according to still another embodiment of the present invention.

In order to prevent leakage of magnetism from the outer ring 11 to the control retainer 16A, in FIG. 10, a magnetism shield ring 70 is mounted to the surface of the outer ring 11, and in FIG. 11, the control retainer 16A is made of a sintered non-magnetic material.

When mounting the rotation transmission device shown in FIG. 1 in an apparatus, the input shaft 1 and the output shaft 2 are rotationally fixedly fitted, respectively, in shaft inserting holes 81 formed in joint shafts 80 on the driving and driven sides, by means of serrations 82. A bolt inserting hole 83 is formed in each joint shaft 80 to extend from the outer periphery thereof and across a portion of the inner wall of the shaft inserting hole 81, and anti-separation bolts 84 are inserted through the respective bolt inserting holes 83 so as to partially engage in bolt engaging grooves 85 formed in the outer peripheries of the input shaft 1 and the output shaft 2, respectively, thereby preventing separation of the input shaft 1 and the output shaft 2.

When the input shaft 1 and the output shaft 2 are inserted into the respective joint shafts 80, chamfers 86 formed on the outer peripheries of the input shaft 1 and the output shaft 2 at their distal ends are brought into surface contact with chamfers 87 formed at the open ends of the shaft inserting holes 81 of the joint shafts 80. Oftentimes, however, the input shaft 1 and the output shaft 2 are inclined relative to the joint shafts 80, and thus the former cannot be smoothly inserted into the latter.

If the bolt engaging grooves 85 formed in the outer peripheries of the input shaft 1 and the output shaft 2 are circular arc-shaped ones extending along the outer peripheries of the anti-separation bolts 84, due to dimensional errors of component parts, the bolt engaging grooves 85 may be axially displaced relative to the bolt inserting holes 83 to such an extent that the anti-separation bolts 84 cannot be inserted into the bolt engaging grooves 85.

Figure 12:
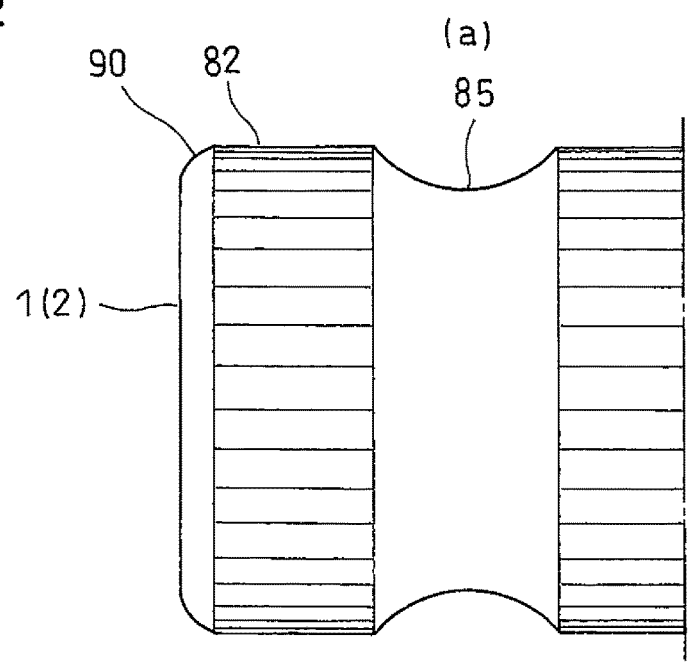
FIG. 12(*a*) is an enlarged view of an end portion of an input shaft shown in FIG. 1.
Figure 12:
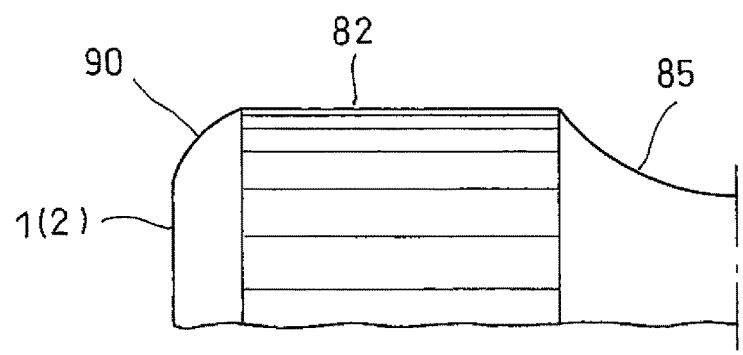
Figure 13:
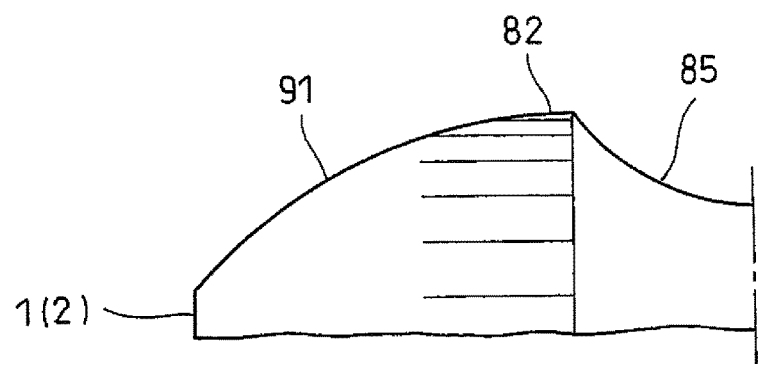
FIG. 13 shows an end portion of a different input shaft.

By forming, as shown in FIGS. 12(a) and 12(b), a circular arc-shaped surface 90 on the outer periphery of each of the input shaft 1 and the output shaft 2 at its distal end portion, or by forming, as shown in FIG. 13, a circular arc-shaped surface 91 on each of the input shaft 1 and the output shaft 2 so as to extend from its end surface to bolt engaging groove 85, the input shaft 1 and the output shaft 2 can be smoothly and easily inserted into the respective joint shafts 80.

Figure 14:
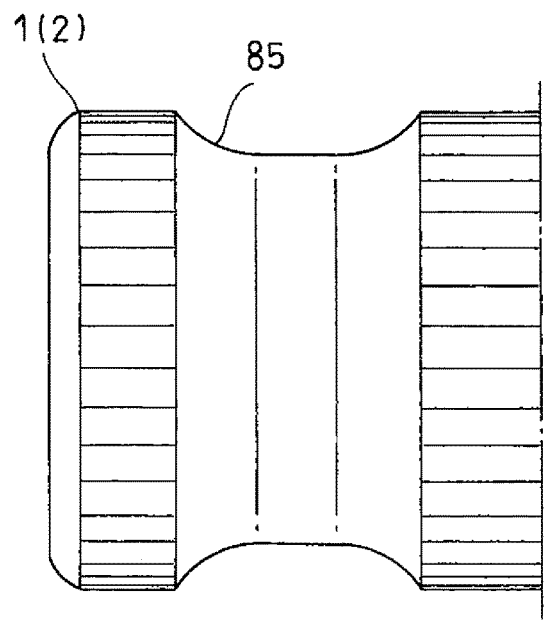
FIG. 14 shows an end portion of a still different input shaft.

If the bolt engaging grooves 85 have an oval section as shown in FIG. 14, the anti-separation bolts 84 can be reliably inserted into the bolt engaging grooves 85 even if the latter are displaced relative to the bolt inserting holes 83 in the axial direction.

DESCRIPTION OF THE NUMERALS

1. Input shaft
2. Output shaft
10. Two-way clutch
11. Outer ring
13. Inner ring

15. Roller (engaging element)
16A. Control retainer
16B. Rotary retainer
22. Bar
24. Tubular portion
26. Bar
27. Pocket
40. Torque cam (Motion converting mechanism)
50. Electromagnetic clutch
51. Armature
52. Rotor
52b. Inner tubular portion
53. Electromagnet
54. Coupling tube
57. Bearing
60. Restricting means
61. Large-diameter portion
70. Magnetism shield ring

What is claimed is:

1. A rotation transmission device comprising:
an input shaft,
an output shaft arranged coaxial with the input shaft,
a two-way clutch configured to selectively allow and prohibit transmission of rotation between the input shaft and the output shaft,
an electromagnetic clutch configured to selectively engage and disengage the two-way clutch, and
a motion converting mechanism,
wherein the two-way clutch includes:
an outer ring provided at an end of the output shaft and having an inner periphery;
an inner ring provided at an end of the input shaft and having an outer periphery;
a control retainer and a rotary retainer including, respectively, first bars and second bars which are disposed between the inner periphery of the outer ring and the outer periphery of the inner ring, and arranged such that the first bars are arranged circumferentially alternately with the second bars to define pockets between adjacent pairs of the first and second bars, wherein the control retainer further comprises a tubular portion formed at an outer peripheral portion of the control retainer;
pairs of engaging elements, each pair of engaging elements being received in a respective one of the pockets so as to be engageable with the inner periphery of the outer ring and the outer periphery of the inner ring; and
elastic members each received in a respective one of the pockets and biasing the corresponding pair of engaging elements received in the respective one of the pockets away from each other,
wherein the electromagnetic clutch comprises:
an armature having at an outer peripheral portion thereof a coupling tube press-fitted to the tubular portion of the control retainer such that the armature is coupled to the control retainer due to the press-fitting;
a rotor axially opposed to and spaced apart from the armature; and
an electromagnet supported by a stationary member so as to be axially opposed to the rotor and configured to apply a magnetic attraction force to the armature when energized, thereby attracting the armature to the rotor, whereby when the electromagnet is energized, the control retainer is moved with the armature in an axial direction toward the rotor,
wherein the motion converting mechanism comprises a cam configured to convert a movement of the control retainer in the axial direction to relative rotation between the control retainer and the rotary retainer in a direction in which circumferential widths of each of the pockets decrease, thereby disengaging the respective pair of engaging elements from the inner periphery of the outer ring and the outer periphery of the inner ring, and
wherein the armature and the control retainer are configured to restrict a fitting amount between the coupling tube of the armature and the tubular portion of the control retainer such that a gap is defined between a back surface of the armature; with respect to a surface of the armature which can be attracted to the rotor; and an end surface of the tubular portion.

2. The rotation transmission device of claim 1, wherein a restricting arrangement comprises a large-diameter portion formed on a radially outer surface of the tubular portion of the control retainer and having an axial end surface which is in abutment with an end surface of the coupling tube at an open end of the coupling tube.

3. The rotation transmission device of claim 2, further comprising a bearing supporting the electromagnet and the input shaft so as to be rotatable relative to each other, wherein the rotor includes an inner tubular portion formed at an inner peripheral portion thereof and having an end surface in abutment with the bearing to restrict a relative axial position between the electromagnet and the rotor.

4. The rotation transmission device of claim 3, further comprising a magnetism shield ring made of a non-magnetic material and provided on at least one of axially opposed surfaces of the outer ring and the control retainer.

5. The rotation transmission device of claim 4, wherein the control retainer is made of a non-magnetic, sintered material.

6. The rotation transmission device of claim 3, wherein the control retainer is made of a non-magnetic, sintered material.

7. The rotation transmission device of claim 2, further comprising a magnetism shield ring made of a non-magnetic material and provided on at least one of axially opposed surfaces of the outer ring and the control retainer.

8. The rotation transmission device of claim 7, wherein the control retainer is made of a non-magnetic, sintered material.

9. The rotation transmission device of claim 2, wherein the control retainer is made of a non-magnetic, sintered material.

10. The rotation transmission device of claim 1, further comprising a bearing supporting the electromagnet and the input shaft so as to be rotatable relative to each other, wherein the rotor includes an inner tubular portion formed at an inner peripheral portion thereof and having an end surface in abutment with the bearing to restrict a relative axial position between the electromagnet and the rotor.

11. The rotation transmission device of claim 10, wherein the control retainer is made of a non-magnetic, sintered material.

12. The rotation transmission device of claim 10, further comprising a magnetism shield ring made of a non-magnetic material and provided on at least one of axially opposed surfaces of the outer ring and the control retainer.

13. The rotation transmission device of claim 12, wherein the control retainer is made of a non-magnetic, sintered material.

14. The rotation transmission device of claim 1, further comprising a magnetism shield ring made of a non-magnetic material and provided on at least one of axially opposed surfaces of the outer ring and the control retainer.

15. The rotation transmission device of claim 14, wherein the control retainer is made of a non-magnetic, sintered material.

16. The rotation transmission device of claim 1, wherein the control retainer is made of a non-magnetic, sintered material.

17. A rotation transmission device comprising:
an input shaft,
an output shaft arranged coaxial with the input shaft,
a two-way clutch configured to selectively allow and prohibit transmission of rotation between the input shaft and the output shaft,
an electromagnetic clutch configured to selectively engage and disengage the two-way clutch, and
a motion converting mechanism,
wherein the two-way clutch includes:
  an outer ring provided at an end of the output shaft and having an inner periphery;
  an inner ring provided at an end of the input shaft and having an outer periphery;
  a control retainer and a rotary retainer including, respectively, first bars and second bars which are disposed between the inner periphery of the outer ring and the outer periphery of the inner ring, and arranged such that the first bars are arranged circumferentially alternately with the second bars to define pockets between adjacent pairs of the first and second bars, wherein the control retainer further comprises a tubular portion formed at an outer peripheral portion of the control retainer;
  pairs of engaging elements, each pair of engaging elements being received in a respective one of the pockets so as to be engageable with the inner periphery of the outer ring and the outer periphery of the inner ring; and
  elastic members each received in a respective one of the pockets and biasing the corresponding pair of engaging elements received in the respective one of the pockets away from each other,
wherein the electromagnetic clutch comprises:
  an armature having at an outer peripheral portion thereof a coupling tube press-fitted to the tubular portion of the control retainer such that the armature is coupled to the control retainer due to the press-fitting;
  a rotor axially opposed to and spaced apart from the armature; and
  an electromagnet supported by a stationary member so as to be axially opposed to the rotor and configured to apply a magnetic attraction force to the armature when energized, thereby attracting the armature to the rotor, whereby when the electromagnet is energized, the control retainer is moved with the armature in an axial direction toward the rotor,
wherein the motion converting mechanism comprises a torque cam including grooves configured to convert a movement of the control retainer in the axial direction to relative rotation between the control retainer and the rotary retainer in a direction in which circumferential widths of each of the pockets decrease, thereby disengaging the respective pair of engaging elements from the inner periphery of the outer ring and the outer periphery of the inner ring, and
wherein the armature and the control retainer are configured to restrict a fitting amount between the coupling tube of the armature and the tubular portion of the control retainer such that a gap is defined between a back surface of the armature with respect to a surface of the armature which can be attracted to the rotor and an end surface of the tubular portion.

* * * * *